INVENTOR
ROY CHARLTON
BY
ATTORNEYS

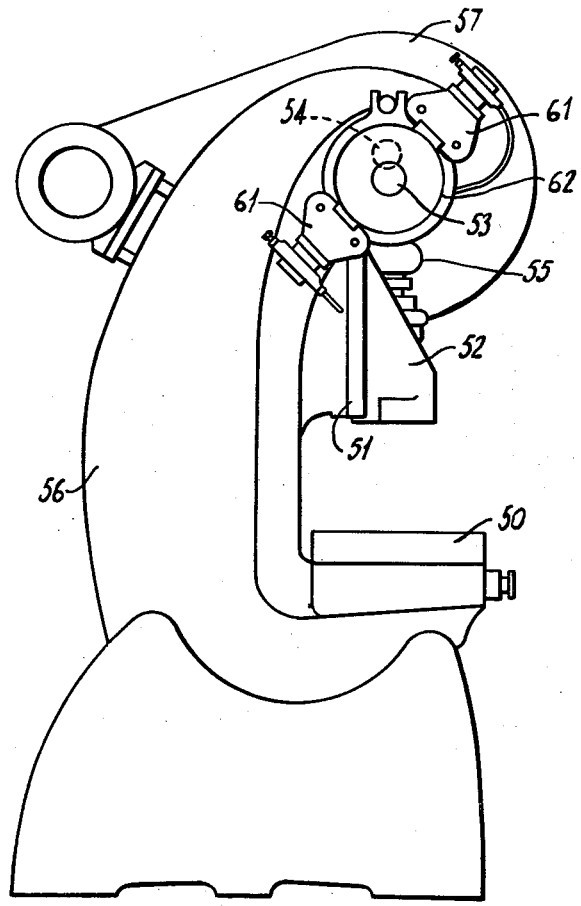
Fig. 3.
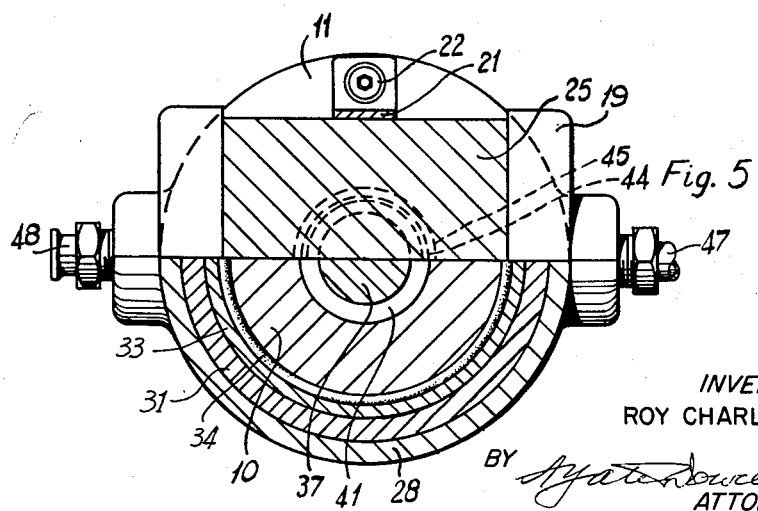
INVENTOR
ROY CHARLTON

INVENTOR
ROY CHARLTON
BY
ATTORNEYS 3,159,247
SPRING APPLIED FLUID PRESSURE
RELEASE BRAKE
Roy Charlton, Sutton Coldfield, England, assignor to Hordern Mason & Edwards Limited, Birmingham, England, a British company
Filed Jan. 29, 1963, Ser. No. 254,682
4 Claims. (Cl. 188—170)

This invention relates to friction brake devices for arresting relative motion between relatively movable members.

The invention has been developed primarily in connection with frictional brakes, for use in connection with power presses or other machine tools, wherein the movable tool carrying member is required to be brought to rest periodically.

In power presses or other machine tools of the kind referred to, only a restricted part of each 360° cycle of rotation of a shaft herein referred to as the driving shaft, for imparting motion to the movable tool carrying member (which may be in the form of a slide or ram), is available as a braking sector and such part does not vary appreciably in angular dimensions regardless of the size of the machine or speed of operation. In practice the braking sector is required generally not to exceed about 100° of driving shaft rotation even at maximum speed of operation on a press or similar machine tool. Furthermore, the characteristics of some auxiliary mechanisms such as guards preventing or restricting access to the movable tool carrying member by the operator require the driving shaft to be brought to rest within a tolerance of plus or minus about 3° of a predetermined position (usually top dead center, where the driving shaft drives a slide or ram through an eccentric element such as a crank, cam or eccentric), and again regardless of the speed of operation.

Further, safety requirements demand that a brake used on a power press or other machine tool of the kind specified, shall have "fail safe" characteristics that is to say, the operating means for the brake shall be so arranged that occurrence of the most probable cause or causes of failure result in movement of the brake to its "on" or operative position, rather than to its "off" or inoperative position.

Further, a particular requirement which arises in the case of power presses or other machine tools of the kind referred to, wherein the driving shaft is operatively connected with a driving member (usually a flywheel or other power storage member) through the intermediary of a friction clutch, which inherently is capable of disengagement at any position of rotation of the driving shaft in a complete work cycle, is that the driving shaft shall be capable of being brought to rest within a sufficiently short space of time (and hence within a small movement of the driving shaft and associated tool carrying member), to prevent or reduce the risk of serious damage or an accident in the event of some improper condition existing in the tools, workpiece, or in the event of the presence of any part of the operator's person within working range of the tools. In general, such time is of the order of 5 to 15 milliseconds. Conventional frictional brakes as hitherto available, do not provide sufficient retardation to enable this condition to be met and attempts to improve the retardation by increasing the size of the brake would introduce further delays arising from time lag between the generation of a "stop" or "unsafe" signal produced by means responsive to one of the conditions previously referred to. Such time lag arises because of the inertia of the moving parts of the brake or because larger dimensions of the brake parts, when the brake is increased in size, result in larger deflections under stress of these parts, which deflections have to be absorbed in movement of the brake before the desired pressure is developed at the friction faces. Furthermore, full application of the brake is delayed by the amount of strain energy to be dissipated, this being the cumulative total of that stored in the form of a fluid under pressure (for example, compressed air), when used to actuate the opearting means of the brake, together with random or regularly recurring deflections under stress of component parts of the brake, for example, brake shoes, bands, plates or levers in conventional designs of brake as well as that stored in compression or deflection of springs means (including legitimate or useful compression or deflection, for the purpose of actuating the operating means as well as non-useful compression or deflection due to the other random or regularly recurring deflections previously mentioned).

The object of the present invention is to provide a new or improved construction of friction brake device which will meet, which will more nearly meet, the problems involved in designing a brake for power press and other said machine tools as referred to generally above, than brakes hitherto available for this purpose.

The invention will now be described by way of example, with reference to the accompanying drawings in which:

FIGURE 3 is a view in side elevation of a power press incorporating a brake including devices as illustrated in FIGURES 1 and 2;

FIGURE 5 is a cross-section on line V—V of FIG 2.

Figure 1:
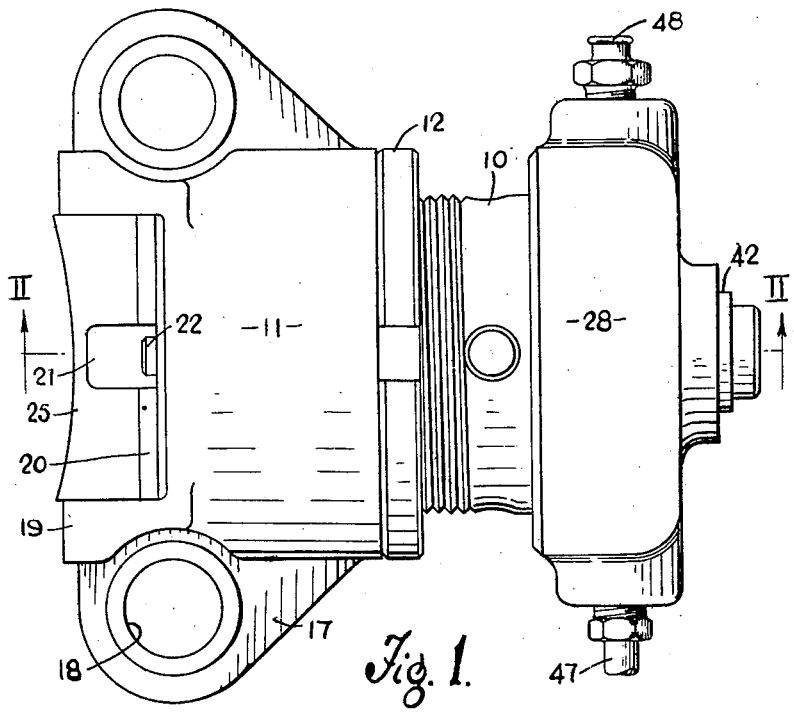
FIGURE 1 is a side elevation view of one construction of device for establishing frictional coupling.

Referring firstly to FIGURE 3 of the drawings, a friction brake device is illustrated in use in a power press. Such press may include any conventional form of supporting structure having a bed or table 50 forming one of the tool carrying members of the press above which the supporting structure affords a guideway 51 for a slide or ram 52 forming the other of the tool carrying members. The slide or ram 52 is adapted to be reciprocated towards and away from the bed or table 50 by a driving shaft 53 having a crank 54 or other eccentric means coupled with the slide or ram 52 by a connecting rod assembly 55.

The driving shaft 53 is journalled in the bearings formed in upstanding side frame members of the supporting structure of which one is seen at 56 and projects outwardly of such side frame members.

On one of the projecting portions of the driving shaft is keyed or otherwise fixed the driven element of a clutch unit, the housing whereof is indicated at 57. The driven element of such clutch, which is preferably of the form disclosed in U.S. patent application No. 859,716 copending, entitled "Improvements Relating To Power Presses and Other Similar Machine Tools," filed on 15 December, 1959, is keyed or otherwise fixed to the driving shaft 53 and the driving elements of the clutch are engaged with the driven element by the application of fluid pressure, for example, hydraulic pressure. The driving element of the clutch may comprise a plurality of individual angularly spaced clutch pads as illustrated diagrammatically at 58 in FIGURE 4 while the driven element 59 may be in the form of a pair of axially spaced discs or annular elements secured to a flywheel concentric with the driving shaft 53.

On the other projecting portion of the driving shaft there is provided a brake unit which comprises a drum 60 keyed or otherwise fixed on the driving shaft and a plurality of stationary braking units, for example, two such units 61 as shown incorporating brake pads movable radially with respect to the circumferential or peripheral face of the drum 60 into and out of engagement therewith. Inward movement is effected by spring means and outward movement by means energised by fluid under pressure, preferably hydraulic fluid.

The units 61 are fixedly mounted on one of the side frame members 56 of the press.

The construction and manner of operation of each of the units 61 will now be more fully described with reference to FIGURES 1 and 2.

Each of the units 61 comprises a body which includes an inner body member 10 in the form of a cylindrical metal block, said body member being screw threaded externally for part of its length extending from one end (hereinafter referred to as its forward end), to a position about midway along its length and over this screw-threaded portion is assembled a cylindrical outer body member 11, which is screw threaded internally to cooperate with the screw-thread of the inner body member 10 and which is capable of being secured to any adjusted position, relative to the latter, by a retaining ring 12 which is also internally screw threaded to cooperate with the exposed portion of the thread on the inner body member, behind the outer body member.

At its forward end, the inner body member 10 is formed with a cylindrical chamber 13 for containing spring means 14. This cylindrical chamber 13 herein referred to as the spring chamber, may typically extend for about ⅓ of the length of the inner body member, and may have a diameter which is typically about 0.8 of the diameter of the inner body member, these figures, however, being mentioned as illustrative.

The outer body member 11 projects forwardly from the mouth of the spring chamber and has a radially inwardly extending lip 15, the inner boundary of which is formed with an annular recess for receiving a sealing ring 16 of resiliently deformable material such as neoprene for retaining lubricant within the spring chamber 13 as hereinafter referred to.

The outer body member further includes an attachment portion enabling it to be secured to a suitable support, comprising a plate 17 disposed at one side of the outer body member and lying in a plane parallel to the axis of the cylindrical opening therethrough, the forward face of the outer body member 11 being of square or rectangular form in cross section in a plane at right-angles to said axis with one of the outer side faces co-planar with the inner face of the plate 17 comprising the attachment portion which projects laterally beyond the adjacent side faces of the outer body member to form projecting lugs which may be apertured as at 18, for the pasasge of fastening elements therethrough.

At the end of the spring chamber at which the sealing ring 16 is situated, the outer body member has forwardly projecting portions 19 at two of the sides thereof, namely, those at right-angles to the plate 17, while being open or slotted at the other two sides.

The forwardly projecting portions 19 of the outer body member form part of a guide means for a pad carrier 20, the remaining part of the guide means being constituted by a pair of brackets 21 of right-angle form, each having one face releasably secured by means of a screw 22 or similar fastening element to the forward end face of the outer body member 11 at the inner part or base of each slot or cut-away side portion thereof, and a second face projecting forwardly in a direction parallel to the axis of the cylindrical chamber. These forwardly projecting faces of the brackets 21 in combination with the forwardly projecting portions 19 of the outer body member form a guide-way for receiving the forward end portion of the pad carrier 20 which is of square or rectangular form in cross-section.

The rearward end face 23 of the pad carrier abuts the end face 24 of the inner body member 10 when the pad carrier is fully retracted, i.e. moved rearwardly to its furthest extent. A pad 25 of the same dimensions as the square or rectangular pad carrier 20 is provided, the forward face of said pad being of concave cylindrical form as seen in FIGURE 1. The pad receiving face of the pad carrier may have formations interfitting with complementary formations on the pad itself, for example, spigot and socket formations (not shown). If desired, the pad may be secured to the pad carrier by a cement which preferably is of a form such that it does not completely set, thereby facilitating removal of the pad from the pad carrier when replacement of the pad becomes necessary.

The pad itself may be formed of a material such as that normally used for brakes (e.g. of the vehicle disc-brake type). Such materials may be an asbestos-base material able to withstand high pressures used in brakes of the disc-type or as a possible alternative, a metal such as bronze may be employed.

It is contemplated that the pad size will normally be such that the area afforded by the pad is small compared with the pad-swept area of the cooperative brake member. Typical pad size would be from 2 to 4 inches square and this would subtend an angle of approximately 20 degrees at the center of rotation of the drum.

The pad carrier is a close sliding fit within the lip 15 previously referred to, and is engaged by the sealing ring 16.

Within the spring chamber 13 is disposed the spring means 14 which comprises a plurality of spring elements collectively acting between the rearwardly presented face 23 of the pad carrier 20 and a forwardly presented face 26 at the rearward end of the spring chamber 13.

These spring elements are in the form of domed or concave washers of the kind known as Belleville washers, and may be packed with oil or grease. Preferably they are so arranged that at least one group of them is disposed with the concave face of one washer in contact with the convex face of the next so that, effectively, they act in parallel with each other, that is to say washers arranged in this way make their individual contributions to the spring thrust in the manner of a leaf spring without this being diminished significantly by the fracture or failure of any other washer of the group.

There are several groups of washers arranged in this way, the concave faces of the two groups being presented in opposite directions so that effectively the groups are in series.

The number of groups and the number of washers in each group would be selected to provide the required thrust on the pad carrier.

Over a normal working distance which is typically in the order of .004", an assembly of spring elements of this type, namely dome or concave washers, provides approximately linear spring characteristics, that is to say the thrust increases linearly with the axial displacement of the pad carrier relatively to the abutment face at the rearward end of the chamber.

The initial position would be defined by abutment of the rear face 23 of the pad carrier 20 with the end face 24 of the inner body member 10 at the mouth of the spring chamber 13.

At the rearward end of the inner body member 10 which is unthreaded externally and is of plain cylindrical form, is provided a chamber 27 for receiving fluid under pressure. In the present example, the fluid is of relatively low lubricating character with respect to metal interfaces, such as a water base fluid. The chamber 27 is in part formed by a cup-shaped component 28 having an internal diameter, such as to receive the rearward end portion of the inner body member 10 as a close sliding fit, this end portion then acting as a plunger or piston with respect to the cup-shaped component 28 and together with the latter completing the enclosure of the chamber, which is formed between the rearward end face 29 of the inner body member and the opposed inner wall 30 of the cup-shaped component.

The cup-shaped component 28 is slidable axially on the inner body member and is sealed with respect thereto, against the leakage of pressurized fluid, by the provision of a circumferential sealing ring 31 in an annular recess 32 in the inner circumferential face of the cup-shaped component 28, the sealing ring 31 being of elastically deformable material, such as that previously mentioned in relation to sealing ring 16, but the ring 31 is of square cross-section so that the ingress of fluid under pressure into the recess 32 does not significantly increase the volume of the recess not filled by the ring 31.

Between the inner circumferential surface of the cup-shaped component 28 and the inner body member 10 there is provided a sleeve 33 which is formed of a synthetic resinous material such as the material known by the name "Delrin."

Between this sleeve 33 and the inner body member there is provided a sealing ring 34 of a material such as that previously mentioned in an annular recess 35, this recess and sealing ring being positioned midway along the length of the sleeve 33.

In order that the pressure of fluid shall build up and reduce at the same or substantially the same rate as that in the chamber 27, vents 36 are provided in the form of grooves extending between the annular recess 35 and the chambers 27, these being formed in the outer circumferential surface of the inner body member.

The sleeve is provided to prolong the life of the seal between the cup-shaped component and the inner body member during relative movement to these parts in the presence of the fluid contained in the chamber which is of a relatively low lubricating character as mentioned above, though it forms an excellent lubricant for the rubber to "Delrin" interfaces.

The cup-shaped component 28 is connected with the pad carrier 20 by a tie rod 37 which extends through a bore in the inner body member 10 with a clearance.

At its rearward end the tie rod is sealed with respect to the cup-shaped component 28 by the provision of an annular recess 38 containing a sealing ring 39 of round cross section, the recess 38 being formed in an opening extending through the end wall of the cup-shaped component 28, through which opening the tie rod projects. The sealing ring 39 is of elastically deformable material, such as that previously mentioned.

The tie rod 37 is sealed with respect to the inner body member by the provision of a sealing ring 40 of square cross section which is backed by a square cross section ring 41 of a synthetic resinous material, for example, "Delrin" the latter being provided to prevent the sealing ring 40 from being forced into the gap between the tie rod and the dome of the inner body member under the influence of the fluid pressure.

In this way it is possible for the tolerance between the tie rod and the bore of the inner body member to be non-critical.

At its rearward end, the tie rod 39 projects from the opening in the cup-shaped component 28 and is retained against forward axial movement relative thereto by means of a snap ring 42 engaging in a groove in the tie rod and seated partly in a rebate 43 or annular recess in the end wall of the cup-shaped component surrounding the mouth of the opening therein, at its rearward end.

The forward end of the tie rod 37 is connected to the pad carrier 20 which, for this purpose, is formed with an opening through which the tie rod extends. The forward end of the tie rod has a head 44 which is seated in a recess 45 in the forward face of the pad carrier, the head being flush with or slightly behind the forwardly presented face of the pad carrier, to which the pad itself is attached.

The tie rod extends through the openings afforded by the Belleville washers.

The inner body member 10 is formed with a plurality of angularly spaced radial sockets 46 for the reception of a tommy bar or like tool to enable the inner body member to be rotated upon slackening of the lock nut 12 thereby adjusting the inner position of the pad carrier and pad assembly relative to the outer body member 11 and hence relative to the brake drum 60.

The cup-shaped component 28 is provided with a unit 47 for connection to a supply pipe for hydraulic fluid under pressure as hereinafter described and also a bleed screw 48.

Figure 4:
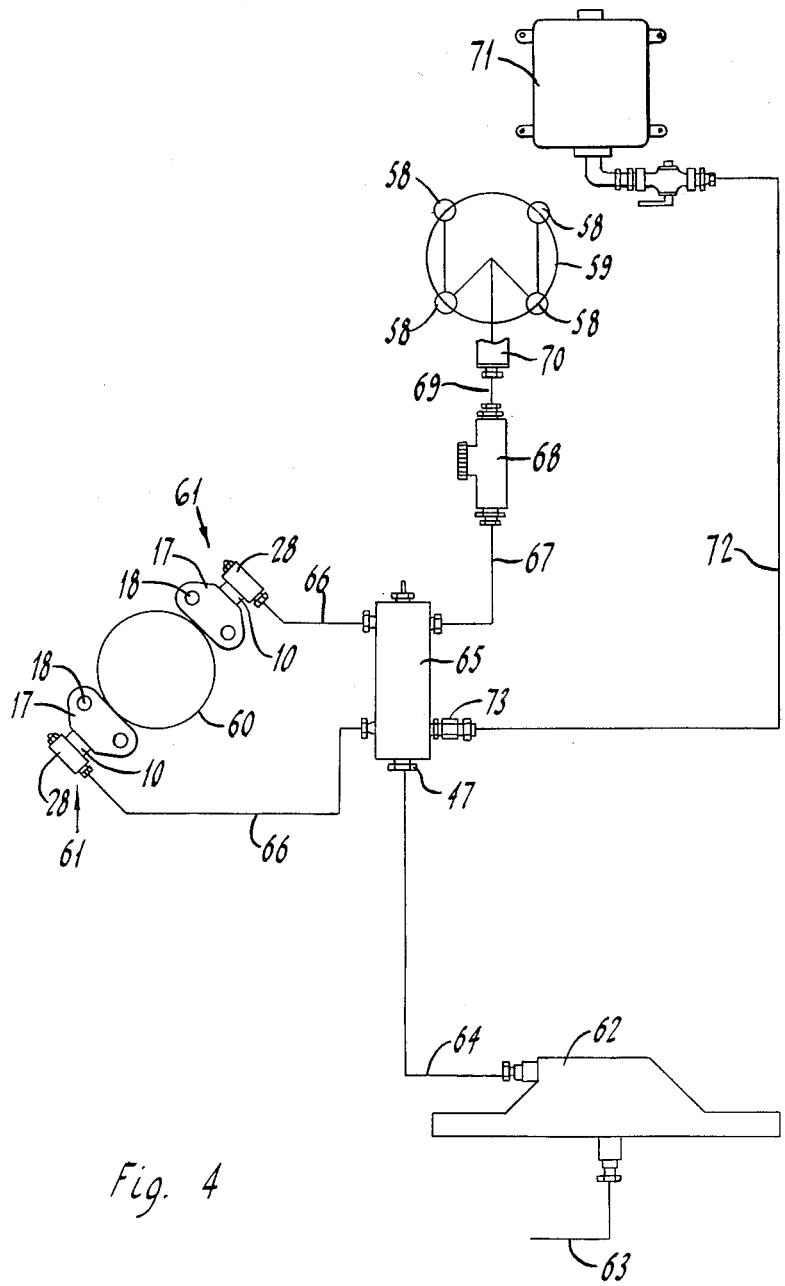
FIGURE 4 is a schematic or diagrammatic view of a fluid pressure system for actuating the devices applied to the press.

For supplying fluid under pressure to the chamber 21 a fluid supply system connected to both the brake and the clutch of the press is provided as shown in FIGURE 4.

In this the source of hydraulic fluid under pressure is constituted by a pressure intensifier 62 which has a chamber containing the hydraulic fluid, and which is subjected to pressure by a piston or plunger, and an air chamber in which is a diaphragm, piston, or plunger of larger area than that operating in the hydraulic fluid chamber and connected mechanically with the latter so as to provide an increase or magnification in pressure as between an air supply pipe 63 connected to the intensifier and a hydraulic outlet pipe 64 also connected thereto.

Figure 2:
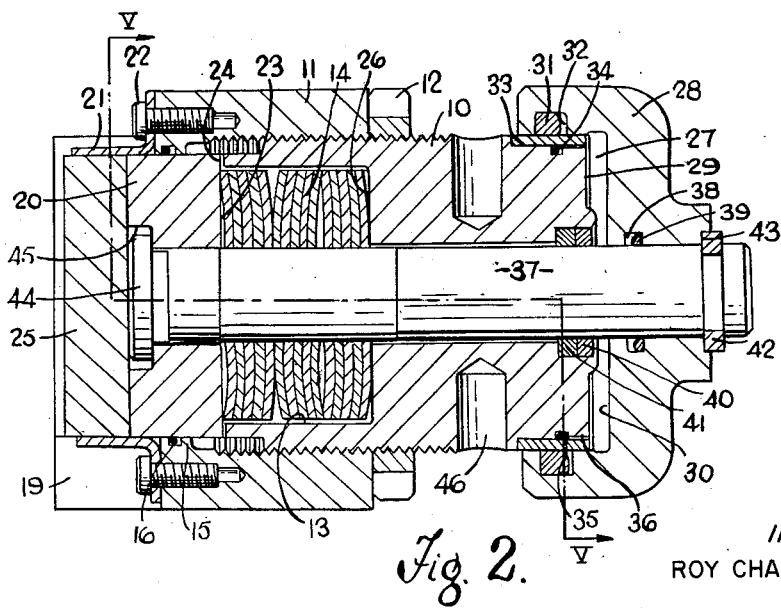
FIGURE 2 is a cross section on the lines II—II in FIGURE 1.

Hydraulic fluid under pressure is distributed from the pipe 64 to the units 61 of the brake by a distribution manifold 65 having outlet pipes 66 connected to the unit 61 so as to communicate with the chambers 27 thereto (FIGURE 2).

Hydraulic fluid is also fed from the manifold 65 through pipes 67, a control valve 68, pipe 69, and a running joint assembly 70, and piston and cylinder units for moving the clutch pads 58 into engagement with the driven member 59 of the clutch as disclosed in the aforementioned patent application No. 859,716.

The valve 68 includes a constrictor valve element for slightly delaying the build-up of pressure in the pipe 69 and in the piston and cylinder units actuating the pads 58 relative to the build-up of pressure in the chambers 27 of the brake units 61 so that the brake is released in advance of clutch engagement. The valve 68 includes means permitting free flow or transmission of hydraulic pressure in the reverse direction without constriction by either a by-pass passageway including a non-return element, or, alternatively the constrictor valve may be displaceable in response to relaxation of pressure in the pipe 67 to permit of free reverse flow of fluid.

A reservoir tank 71 for the hydraulic fluid is connected by a pipe 72 to the manifold 65 through the intermediary of a non-return valve 73. The valve element of the valve 73 may be a ball or other movable member which is displaced against either gravitational loading or spring means against a seating to effect a seal in response to the establishment of pressure in the manifold 75. The extent of travel of this valve element is small, for example, a few thousandths of an inch, in order to avoid operation of the valve producing any significant delay in the build up of pressure in the chambers 27 of the brake units 61.

The operation of the brake is as follows.

Upon establishment of air pressure in the pipe 63 and resultant hydraulic pressure in the pipe 64 the chambers 27 of the units 61 are pressurized withdrawing the cup-shaped members 28 rearwardly. The pad carriers 20 and pads 25 are thus withdrawn radially outwardly of the circumferential or peripheral face of the brake drum 60 by virtue of the mechanical connection afforded by the tie rod 37 between each pad carrier 20 and its associated cup-shaped member 28.

At a time thereafter dependent upon the setting of the control valve 68 the actuating piston and cylinder units for the clutch pads 58 become pressurized to engage the clutch.

An exhaust of the air chamber of the intensifier causes hydraulic pressure to fall in the pipe 64 and hence in the pipes 66 and chambers 27.

Under these conditions the pad carrier 20 and pads 25 are advanced radially inwardly towards the circumferential or peripheral face of the drum 60 and engage therewith under pressure afforded by the spring assembly.

The simultaneous relaxation of pressure in the pipes 67 and 69 permits the clutch pads 58 to release their frictional grip on the driven clutch member 59.

Because of the small clearance, typically 0.004 inch, existing between the operative faces of the brake pads 25 and the opposed circumferential or peripheral face of the brake drum 60 the travel which each brake pad has to undergo before full braking pressure is applied is small and consequently the flow of hydraulic fluid in the system is also small.

The same conditions apply with respect to the actuating units for the clutch pads 58 which in the "disengaged" position of the clutch, are disposed immediately adjacent to or in very light rubbing contact with opposed faces of the driving clutch member 59 so that again there is very little fluid flow through the pipes 67 and 69.

The whole system thus operates predominantly as a "pressure device" as distinct from a "displacement device" insofar as the transmission of forces from the intensifier through the hydraulic fluid to the brake and to the clutch are concerned.

The small or even negligible flow of fluid is beneficial in that it reduces the time lag between establishment of fluid pressure in the intensifier and the instant at which the clutch can be engaged and the brake disengaged.

There is also very little fluid friction due to the small or negligible volume of flow through the pipes, manifold, and valves.

As previously mentioned the travel of the valve element in the non-return valve 73 is made small so that significant fluid flow is not required in the pipe 64 to displace this valve element to its closed or sealing position.

During the times when fluid pressure is discontinued, that is when the brake is applied and the clutch disengaged, the valve element can revert to its open position and "make-up" fluid is then supplied from the reservoir 71 to make good any slight loss of fluid from the chambers 27 or from the piston and cylinder units actuating the clutch pads 58.

When fluid pressure in the chambers 27 is discontinued the spring assemblies 14 produce immediate movement of the pad carriers 20 and pads 25 towards the circumferential or peripheral face of the brake drum 60 without any significant proportion of the force or thrust available from the spring assemblies being absorbed in elastic straining of intervening parts. It will be evident that the body 10 of each of the units 61 and the pad carriers 20 are each of block-like form and are stressed compressively by the action of the spring assemblies 14 intervening between the abutment face 26 of the body 10 and the rearward end face 23 of the pad carrier 20. The dimensions of these parts are such that there is practically no elastic strain and the whole of the force or thrust of the spring assembly is thus usefully applied instantaneously in the form of contact pressure between the pad 25 and the circumferential or peripheral face of the brake drum.

What I then claim is:

1. A friction brake device for arresting relative motion between relatively movable members comprising:
   (a) a sleeve-like outer body member including attachment means for mounting on one of said relatively movable members and having at its forward end a portion defining a guideway extending longitudinally internally of said outer body member,
   (b) a substantially solid or block like inner body member having an axially extending bore and disposed in said outer body member with its forward end spaced rearwardly of said guideway,
   (c) a pad carrier disposed in said guideway and movable therealong,
   (d) a brake pad disposed on said pad carrier,
   (e) spring means interposed between said forward end of said inner body member and said pad carrier for urging the latter forwardly along said guideway into an operative position in which said brake pad engages the other of said relatively movable member,
   (f) a pressure fluid chamber at the rearward end of said inner body member having a movable end member,
   (g) connecting means extending through said bore in said inner body member between said movable end member and said pad carrier to enable the latter to be moved rearwardly along said guideway into a retracted position in which a clearance exists between said brake pad and said other relatively movable member in response to establishment of fluid pressure in said pressure fluid chamber and resultant longitudinal sliding of said movable end member.

2. A friction brake device for arresting relative motion between relatively movable members comprising:
   (a) the structure as claimed in claim 1 wherein,
   (b) said inner body member affords a forwardly presented open ended spring chamber containing said spring means,
   (c) said spring means comprise a plurality of concave plates of resilient metal assembled in a pack face-to-face,
   (d) and adjustment means are provided comprising means on said inner body member cooperating with means on said outer body member for holding said inner body member in any of a number of positions through a range of axial adjustment whereby said clearance can be adjusted.

3. A friction brake device for arresting relative motion between relatively movable members comprising:
   (a) a sleeve like outer body member including attachment means for mounting on one of said relatively movable members and having at its forward end a portion defining a guideway extending longitudinally internally of said outer body member,
   (b) a substantially solid or block like inner body member having an axially extending bore and an open ended chamber at its forward end and disposed in said outer body member with its forward end spaced rearwardly of said guideway,
   (c) a pad carrier of non-circular shape in transverse cross-section disposed in and capable of movement along said guideway,
   (d) a brake pad disposed on said pad carrier, which latter is movable between an operative and a retracted position in which said brake pad is respectively in contact with and held clear of the other of said relatively movable members,
   (e) spring means comprising a plurality of apertured concave resilient metal plates assembled face to face in a pack in said chamber between said forward end of said inner body member and said pad carrier urging the latter into said operative position,
   (f) a cup shaped member assembled slidably with said inner body member at the rearward end thereof to define in combination therewith a pressure fluid chamber,
   (g) a tie member extending through said bore in said inner body member between said cup shaped member and said pad carrier to enable said brake pad to be moved rearwardly into said retracted position by establishment of fluid pressure in said pressure fluid chamber and resultant sliding of said cup shaped member,
   (h) guide faces on said outer body member,
   (i) complementary peripheral faces on said pad carrier cooperating with said guide faces to permit movement of said pad carrier along said guideway while restraining said pad carrier against rotation, (j) said inner body member having an external screw thread, (k) said outer body member having an internal screw thread cooperating with said screw thread on said inner body member to enable the position of the latter to be adjusted longitudinally relative to said outer body member by rotation of said inner body member, (l) said inner body member at said rearward end and said cup shaped member being of circular shape in transverse cross-section so that the former can rotate in the latter.

4. A friction brake device for arresting relative motion between relatively movable members comprising:

(a) the structure as claimed in claim 3 wherein, (b) said attachment means comprise a pair of laterally extending lugs formed on said outer body member to enable the latter to be fixed on one of said relatively movable members and held against rotation relative thereto, (c) and said inner body member is provided with a formation between the rearward end of said outer body member and said cup shaped member capable of cooperating with a tool to enable said inner body member to be rotated within said outer body member.

References Cited by the Examiner
UNITED STATES PATENTS

| 2,342,750 | 2/44 | Newell | 188—170 |
| 2,493,495 | 1/50 | May | 192—17.1 |
| 2,540,965 | 2/51 | Schillinger | 192—52 |
| 3,033,325 | 5/62 | Tjernstrom | 188—170 |
| 3,118,520 | 1/64 | Tjernstrom | 188—170 |

ARTHUR L. LA POINT, *Primary Examiner.*
DAVID J. WILLIAMOWSKY, *Examiner.*